United States Patent
Tamaki et al.

(10) Patent No.: US 11,401,584 B2
(45) Date of Patent: Aug. 2, 2022

(54) ALUMINUM ALLOY SHEET FOR BATTERY LID USE FOR FORMING INTEGRATED EXPLOSION-PROOF VALVE AND METHOD OF PRODUCTION OF SAME

(71) Applicant: Nippon Light Metal Company, Ltd., Tokyo (JP)

(72) Inventors: Yuuichi Tamaki, Inazawa (JP); Keiji Kanamori, Inazawa (JP); Daisuke Shimosaka, Shizuoka (JP); Toshiya Anami, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 376 days.

(21) Appl. No.: 16/644,639

(22) PCT Filed: Jul. 12, 2019

(86) PCT No.: PCT/JP2019/027789
§ 371 (c)(1),
(2) Date: Mar. 5, 2020

(87) PCT Pub. No.: WO2020/039792
PCT Pub. Date: Feb. 27, 2020

(65) Prior Publication Data
US 2021/0062302 A1   Mar. 4, 2021

(30) Foreign Application Priority Data

Aug. 23, 2018   (JP) .............................. JP2018-156521

(51) Int. Cl.
| | |
|---|---|
| C22C 21/00 | (2006.01) |
| H01M 50/155 | (2021.01) |
| B22D 11/00 | (2006.01) |
| C21D 8/02 | (2006.01) |
| C21D 9/46 | (2006.01) |

(52) U.S. Cl.
CPC ............ C22C 21/00 (2013.01); B22D 11/003 (2013.01); C21D 8/0226 (2013.01); C21D 8/0236 (2013.01); C21D 9/46 (2013.01); H01M 50/155 (2021.01)

(58) Field of Classification Search
None
See application file for complete search history.

(56) References Cited

U.S. PATENT DOCUMENTS

2020/0091483 A1   3/2020   Tamaki et al.

FOREIGN PATENT DOCUMENTS

| CN | 107502787 A | 12/2017 |
|---|---|---|
| CN | 107604212 A | 1/2018 |
| JP | H09-199088 A | 7/1997 |
| JP | 2002-134069 A | 5/2002 |
| JP | 2004-197172 A | 7/2004 |
| JP | 2007-107048 A | 4/2007 |
| JP | 2008-261008 A | 10/2008 |
| JP | 5004007 B | 8/2012 |
| JP | 2012-177186 A | 9/2012 |
| JP | 2013-104072 A | 5/2013 |
| JP | 5872256 B | 3/2016 |
| JP | 2019-102431 A | 6/2019 |
| WO | 2013/008314 A1 | 1/2013 |

OTHER PUBLICATIONS

International Search Report for PCT/JP2019/027789, dated Oct. 15, 2019.

*Primary Examiner* — Daniel J. Schleis
(74) *Attorney, Agent, or Firm* — Merchant & Gould P.C.

(57) ABSTRACT

Aluminum alloy sheet for battery lid use having suitable strength and excellent in formability and work softenability, which aluminum alloy sheet for battery lid use enabling formation of an integrated explosion-proof valve with little variation in operating pressure and excellent in cyclic fatigue resistance, and a method of production of the same are provided, the aluminum alloy sheet for battery lid use for forming an integrated explosion-proof valve having a component composition containing Fe: 1.05 to 1.50 mass %, Mn: 0.15 to 0.70 mass %, Ti: 0.002 to 0.15 mass %, and B: less than 0.04 mass %, having a balance of Al and impurities, having an Fe/Mn ratio restricted to 1.8 to 7.0, restricting, as impurities, Si to less than 0.40 mass %, Cu to less than 0.03 mass %, Mg to less than 0.05 mass %, and V to less than 0.03 mass %, having a tensile strength of 95 MPa or more, having a value of elongation of 40% or more, having a recrystallized structure, having a value of (TS95−TS80) of less than −3 MPa when defining a tensile strength after cold rolling by a rolling reduction of 80% as TS80 and defining a tensile strength after cold rolling by a rolling reduction of 95% as TS95, and having a value of elongation after cold rolling by a rolling reduction of 90% of 5.0% or more. Furthermore, an average grain size of the recrystallized grains of the recrystallized structure is preferably 15 to 30 μm.

4 Claims, No Drawings

ALUMINUM ALLOY SHEET FOR BATTERY LID USE FOR FORMING INTEGRATED EXPLOSION-PROOF VALVE AND METHOD OF PRODUCTION OF SAME

This application is a National Stage Application of PCT/JP2019/027789, filed Jul. 12, 2019, which claims benefit of Japanese Patent Application No. 2018-156521, filed Aug. 23, 2018, which applications are incorporated herein by reference. To the extent appropriate, a claim of priority is made to each of the above-disclosed applications.

FIELD

The present invention relates to aluminum alloy sheet for battery lid use for forming an integrated explosion-proof valve used in a rectangular box shape, cylindrical shape, or other shape of lithium ion battery in which the variation in operating pressure is small.

BACKGROUND

In recent years, emission controls on automobiles have become tougher in many countries. Production of electric vehicles as environmentally friendly vehicles has been rapidly growing. The secondary batteries used in electric vehicles are currently mainly lithium ion batteries. As the cases of lithium ion batteries, there are various types such as rectangular box shapes, cylindrical shapes, and laminate shapes, but in the case of rectangular box shapes and cylindrical shapes, cases made by drawing or ironing (also referred to as DI) aluminum alloy sheet enabling lightening of weight are being used.

In this way, as material for battery case use, aluminum alloy sheet is being demanded since it is excellent in workability, easy to draw and iron, and further is high in strength. PTL 1 proposes aluminum alloy sheet for case use excellent in high temperature swelling resistance characterized by containing Mn: 0.8 to 2.0% (mass %, same below), restricting an amount of Fe as an impurity to 0.6% or less and an amount of Si to 0.3% or less, having a balance of substantially Al, having an amount of Mn in solid solution of 0.75% or more and a ratio of an amount of Mn in solid solution to an amount of Mn added of 0.6 or more, and furthermore having a yield strength value of 185 to 260 N/mm$^2$ in range. According to this, aluminum alloy sheet for case use resistant to deformation due to swelling and excellent in high temperature swelling resistance in particular when the temperature rises to a high temperature of 70 to 90° C. or so and the internal pressure increases, that is, even at the time of application of high temperature and internal pressure, is provided.

Further, PTL 2 proposes aluminum alloy sheet for rectangular cross-sectional battery container use containing, as the composition of the aluminum alloy sheet, Si: 0.10 to 0.60 wt %, Fe: 0.20 to 0.60 wt %, Cu: 0.10 to 0.70 wt %, Mn: 0.60 to 1.50 wt %, Mg: 0.20 to 1.20 wt %, Zr: over 0.12 to less than 0.20 wt %, Ti: 0.05 to 0.25 wt %, and B: 0.0010 to 0.02 wt % and having a balance of Al and unavoidable impurities and having a 45° earring rate with respect to the rolling direction by the cylindrical container deep drawing method of 4 to 7%. According to this, aluminum alloy sheet with a high product yield, good rectangular DI formability of the sheet, and excellent pulse laser weldability is provided.

Furthermore, PTL 3 proposes aluminum alloy sheet for battery case use excellent in formability and weldability having a component composition containing Fe: 0.3 to 1.5 mass %, Mn: 0.3 to 1.0 mass %, and Ti: 0.002 to 0.20 mass %, having an Mn/Fe mass ratio of 0.2 to 1.0, having a balance of Al and impurities, and containing as impurities Si in less than 0.30 mass %, Cu in less than 0.20 mass %, and Mg in less than 0.20 mass %, having a metal structure with a number of second phase particles of a circle equivalent size of 5 μm or more of less than 500 particles/mm$^2$, having a 5% or more value of elongation, and exhibiting a 90 MPa or more of tensile strength as a cold rolled material. According to this, the sheet has a high strength and is excellent in formability and further is provided with excellent laser weldability, so can produce at a low cost a container for a secondary battery use which is excellent in sealing performance and enables swelling to be kept down.

A lithium ion battery for automobile use is rapidly charged and discharged, so full consideration is given to its safety in design. However, if the battery breaks down due to an unforeseen circumstance and the internal pressure inside the battery container rapidly rises, the internal pressure has to be released, so the battery container or battery lid is provided with an explosion-proof valve. This explosion-proof valve has to reliably operate by automatically breaking etc. when the internal pressure of the container exceeds a predetermined pressure.

For example, PTL 4 proposes a sealed battery comprised of a battery container sealed by a battery lid by welding or caulking or another method and given a safety mechanism in which the battery lid or battery container of the sealed battery is provided with at least one through hole A and the through hole A is sealed by a metal thin sheet which breaks due to internal pressure of the battery, in which sealed battery, a metal sheet of a size not larger than the metal thin sheet and having at least one through hole B is superposed over the metal thin sheet and seam welded to the battery lid or battery container.

If providing this explosion-proof valve at the battery lid, by integrally forming the explosion-proof valve at the battery lid, that is, making the lid one with a so-called integrated explosion-proof valve, it is possible to cut the manufacturing cost of the battery lid. PTL 5 describes aluminum alloy sheet for battery lid use having a composition comprising Fe: 1.15 to 1.35 mass %, Mn: 0.40 to 0.60 mass %, and a balance of Al and impurities and restricting impurities to Si in 0.15 mass % or less, Cu in 0.05 mass % or less, and Mg in 0.05 mass % or less and having a structure at the rolling surface of a maximum width of the grains in the direction perpendicular to the rolling direction of 100 μm or less and an average of the widths of the grains of 25 μm or less. According to this, the component composition is prescribed. Further, by using a continuous annealing furnace, the final annealing is performed by rapid heating and rapid cooling, so there are no coarse grains and the structure is comprised of fine grains, so the desired pressure resistant strength is exhibited and variations in pressure resistant strength become smaller.

Further, PTL 6 describes an aluminum alloy sheet material for lithium ion battery sealing material use having a composition containing, by mass %, Mn: 0.8% to 1.5%, Si: 0.6% or less, Fe: 0.7% or less, Cu: 0.20% or less, and Zn: 0.20% or less and having a balance of Al and unavoidable impurities and having, when a thickness of the original sheet is T0 and a thickness after press forming is T1 and cold working degree R (%)=[(T0−T1)/T0]×100 and comparing a tensile strength TS80 when R is 80% (MPa) and a tensile strength TS96 when R is 96% (MPa), a (TS96−TS80) of less than 15 MPa and TS80 of 200 MPa or more. According to this, the work hardenability is reduced, heat treatment after press forming becomes unnecessary, and the operating pressure of the explosion-proof valve can be kept from becoming higher.

CITATIONS LIST

Patent Literature

[PTL 1] Japanese Unexamined Patent Publication No. 2002-134069
[PTL 2] Japanese Unexamined Patent Publication No. 2004-197172
[PTL 3] Japanese Unexamined Patent Publication No. 2012-177186
[PTL 4] Japanese Unexamined Patent Publication No. H9-199088
[PTL 5] Japanese Patent No. 5004007
[PTL 6] Japanese Patent No. 5872256

SUMMARY

Technical Problem

It is true that 3000-series aluminum alloy sheets are excellent in formability, are high in strength, and are provided with the features required as materials for lithium ion battery container use. However, with aluminum alloy sheet containing Mn and Fe as essential elements and having an Mn content higher than the Fe content, the amount of Mn in solid solution in the matrix is high and therefore the work hardening due to cold working becomes remarkable, so this is not suited as a material for use for a battery lid with an integrated explosion-proof valve obtained by forming a thin wall part by press forming.

A battery lid with an integrated explosion-proof valve is cold press formed by an 80% to 95% or so working rate when forming a thin part of an explosion-proof valve, so only naturally aluminum alloy sheet having a suitable strength, excellent in formability, and kept from being work hardened at a high working rate is demanded as the material for a battery lid with an integrated explosion-proof valve. In particular, lithium ion batteries for car mounting use generate large amounts of heat inside at the time of charging and discharging, so the internal pressure applied to the thin part of the integrated explosion-proof valve repeatedly changes with each charging and discharging. Therefore, as the material used, one excellent in heat radiating ability is necessary. Further, the thin part of the integrated explosion-proof valve which is formed is required to be small in variation of the operating pressure and excellent in cycled fatigue characteristic.

In this regard, as the case of a lithium ion battery, there are a rectangular box shape, cylindrical shape, laminate shape, and various other types, but a cylindrical shape exhibits a circular cross-section, so the manufacturing cost is low and it is easy to make the temperature distribution at the inside uniform at the time of charging and discharging. Recently, in particular as car-mounted lithium ion batteries, cylindrical type lithium ion batteries such as the 18650 have been the focus of attention. However, if placing a plurality of cylindrical shaped lithium ion batteries inside a predetermined car-mounted battery pack, there is the drawback that gaps will end up being formed and the ostensible energy density inside the car-mounted battery pack at the time of full charging will end up falling. A rectangular box shape lithium ion battery is somewhat higher in manufacturing cost, but there is the advantage that a plurality can be densely arranged inside a predetermined car-mounted battery pack and the ostensible energy density inside the car-mounted battery pack at the time of full charging can be raised.

In the aluminum alloy sheet for battery lid use described in PTL 5, Mn and Fe are contained as essential elements and the Fe content is higher than the Mn content, but only a rectangular shape battery lid and rectangular shape explosion-proof valve are shown. A circular shaped explosion-proof valve is not shown. Further, in the aluminum alloy sheet material for lithium ion battery sealing material use described in PTL 6, the work hardenability is reduced and heat treatment after press forming becomes unnecessary and also the operating pressure of the explosion-proof valve can be kept from becoming higher, but the variation in operating pressure of the explosion-proof valve is not particularly alluded to.

The present invention was made in consideration of the above such prior art and has as its object the provision of aluminum alloy sheet for battery lid use having suitable strength and excellent in formability and work softenability and enabling the formation of an integrated explosion-proof valve with little variation in operating pressure and excellent in resistance to cyclic fatigue and a method of production of the same. The aluminum alloy sheet for battery lid use of the present invention is used as a lid for a lithium ion battery, but can be applied as a battery lid regardless of the shape of the battery container. That is, the planar shape of the battery lid may, for example, be a circular shape, elliptical shape, rectangular shape, hexagonal shape, or any other shape and may be a shape of a combination of arcs and straight lines like the ground. The aluminum alloy sheet for battery lid use of the present invention is used as a lid of a lithium ion battery, but regardless of the shape of the battery lid, the battery lid is integrally formed with an explosion-proof valve. That is, the planar shape of the integrated explosion-proof valve may, for example, be a circular shape, elliptical shape, rectangular shape, hexagonal shape, or any other shape and may be a shape of a combination of arcs and straight lines like the ground.

Solution to Problem

The aluminum alloy sheet for battery lid use for forming an integrated explosion-proof valve of the present invention, to achieve that object, is characterized by having a component composition containing Fe: 1.05 to 1.50 mass %, Mn: 0.15 to 0.70 mass %, Ti: 0.002 to 0.15 mass %, and B: less than 0.04 mass %, having a balance of Al and impurities, having an Fe/Mn ratio restricted to 1.8 to 7.0, restricting, as impurities, Si to less than 0.40 mass %, Cu to less than 0.03 mass %, Mg to less than 0.05 mass %, and V to less than 0.03 mass %, having a tensile strength of 95 MPa or more, having a value of elongation of 40% or more, having a recrystallized structure, having a value of (TS95−TS80) of less than −3 MPa when defining a tensile strength after cold rolling by a rolling reduction of 80% as TS80 and defining a tensile strength after cold rolling by a rolling reduction of 95% as TS95, and having a value of elongation after cold rolling by a rolling reduction of 90% of 5.0% or more. Furthermore, preferably an average grain size of the recrystallized grains of the recrystallized structure is 15 to 30 μm.

Further, the method of production of aluminum alloy sheet for battery lid use for forming an integrated explosion-proof valve of the present invention comprises, to achieve the object, a slab casting process of casting an aluminum alloy melt having the above described component composition into a cast ingot by a semicontinuous casting method, a homogenization treatment process of homogenizing the cast ingot at a 520 to 620° C. holding temperature for a 1 hour or more holding time, a hot rolling process of setting a start temperature to 420 to less than 520° C. after the homogenization treatment process so as to hot roll the cast ingot to obtain hot rolled sheet, a cold rolling process of cold rolling the hot rolled sheet to obtain a cold rolled sheet, and a final annealing process of annealing the cold rolled sheet in a batch furnace for final annealing. Furthermore, in the cold rolling process, it is preferable to perform the final cold rolling with a final cold rolling reduction of 50% to 95% in range and, in the final annealing process, to perform the final annealing with a holding temperature of 300 to 450° C. for 1 hour or more.

Advantageous Effects of Invention

The aluminum alloy sheet for battery lid use for forming an integrated explosion-proof valve of the present invention has a tensile strength of 95 MPa or more, a value of elongation of 40% or more, and a recrystallized structure, has a value of (TS95−TS80) of less than −3 MPa when defining a tensile strength after cold rolling by a rolling reduction of 80% as TS80 and defining a tensile strength after cold rolling by a rolling reduction of 95% as TS95, and has a value of elongation after cold rolling by a rolling reduction of 90% of 5.0% or more, so has suitable strength and is excellent in formability and work softenability. Furthermore, the integrally formed explosion-proof valve has little variation in operating pressure and is excellent in cyclic fatigue resistance.

Aluminum alloy melt of a predetermined component composition is semicontinuously cast by a DC casting machine to obtain a cast ingot. The two surfaces were cut, then the ingot was homogenized and hot rolled. The obtained hot rolled sheet was taken up in a roll. The temperature of the homogenization is made 520 to 620° C. By setting the start temperature of the hot rolling to less than 520° C., the Mn and Si in solid solution are made to be absorbed in the Al—(Fe.Mn)—Si and other Fe-based compounds or $Al_6Mn$ and other Mn-based precipitates are made to precipitate so as to reduce the amount of Mn in solid solution and the amount of Si in solid solution in the matrix. The hot rolled sheet is cold rolled to a predetermined thickness then if necessary is made to soften by interannealing at 300 to 400° C. in a batch furnace, is cold rolled by a final cold rolling reduction of 50% to 95%, then is annealed by final annealing in a batch furnace at 300 to 450° C. to obtain an annealed material (0 material). Furthermore, it may be cold rolled to obtain a cold rolled material (H material).

The aluminum alloy sheet for battery lid use for forming an integrated explosion-proof valve produced according to the present invention has a tensile strength of 95 MPa or more, a value of elongation of 40% or more, has a recrystallized structure, has a value of (TS95−TS80) of less than −3 MPa when defining a tensile strength after cold rolling by a rolling reduction of 80% as TS80 and defining a tensile strength after cold rolling by a rolling reduction of 95% as TS95, and has a value of elongation after cold rolling by a rolling reduction of 90% of 5.0% or more, so has suitable strength and is excellent in formability and work softenability. Furthermore, the integrally formed explosion-proof valve has little variation in operating pressure and is excellent in cyclic fatigue resistance.

DESCRIPTION OF EMBODIMENTS

Cases where conventional aluminum alloy sheet for battery lid use, even if it is high strength, finely crack or otherwise become defective when being worked to form an integrated explosion-proof valve in the battery lid are also often seen. This is believed to be caused by the large amount of Mn in solid solution in the final sheet. For this reason, it is necessary to suitably control the homogenization temperature of the cast ingot or the start temperature of the hot rolling to fully adjust the amount of Mn in solid solution. Further, the aluminum alloy sheet for battery lid use for forming an integrated explosion-proof valve has to be cold worked by a working rate of 80% to 95% or so in order to form the thin part in the process for forming the integrated explosion-proof valve and therefore has to be one excellent in formability.

In particular, a car-mounted lithium ion battery generates a large amount of heat internally at the time of charging and discharging, so the internal pressure acting on the thin part of the integrated explosion-proof valve with each charging and discharging repeatedly changes. Therefore, as the material used, one excellent in heat radiation ability is required. Furthermore, the formed integrated explosion-proof valve is desirably small in variation of operating pressure and excellent in cyclic fatigue characteristic.

As explained above, in forming the integrated explosion-proof valve, the sheet is cold worked by a working rate of 80% to 95% or so to form a thin part. Therefore, to make it excellent in the cyclic fatigue characteristic of the thin part, it is necessary to make it aluminum alloy sheet for battery lid use having a predetermined component composition, having a recrystallized structure, excellent in work softenability in cold working of a high working rate, and having a high value of elongation after cold rolling by a predetermined rolling reduction.

This content will be explained below:

First, the actions, suitable contents, etc. of the elements contained in the aluminum alloy sheet for battery lid use for forming an integrated explosion-proof valve of the present invention will be explained.

Fe: 1.05 to 1.50 Mass %

Fe, in a composition within the scope of the present invention, causes Al—(Fe.Mn)—Si and other Fe-based intermetallic compounds to precipitate in the cast ingot at the time of casting. At the time of homogenization treatment, these Fe-based intermetallic compounds absorb the Mn in solid solution in the matrix, so Fe is an essential element.

If the Fe content is less than 1.05 mass %, the size and number of Fe-based intermetallic compounds in the cast ingot will decrease, so it will no longer be possible to sufficiently lower the amount of Mn in solid solution in the cast ingot at the time of homogenization treatment. For this reason, for the final sheet, the work hardening at a high working rate is liable to become remarkable. If the Fe content exceeds 1.50 mass %, the size and number of Fe-based intermetallic compounds will increase, so the formability of the final sheet will fall and the value of elongation after cold rolling by a rolling reduction of 90% is liable to become less than 5.0%.

Therefore, the Fe content is made 1.05 to 1.50 mass % in range. The preferable Fe content is 1.05 to 1.45 mass % in range. The more preferable Fe content is 1.10 to 1.45 mass % in range.

Mn: 0.15 to 0.70 Mass %

Mn is an element making the yield strength of the aluminum alloy sheet increase. The part forms a solid solution in the matrix to promote solid solution strengthening, so this is an essential element.

If the Mn content is less than 0.15 mass %, the Fe/Mn ratio is liable to exceed 7.0. The Fe-based intermetallic compounds in the cast ingot become needle shapes. The value of elongation after cold rolling the final sheet by a rolling reduction of 90% is liable to become less than 5.0%. If the Mn content exceeds 0.70 mass %, the Fe/Mn ratio is liable to become less than 1.8, the amount of Mn in solid solution in the cast ingot will become too high and, for the final sheet, a value of elongation after cold rolling by a rolling reduction of 90% is liable to become less than 5.0%.

Therefore, the Mn content is made 0.15 to 0.70 mass % in range. The preferable Mn content is 0.15 to 0.65 mass % in range. The more preferable Mn content is 0.20 to 0.65 mass % in range.

Fe/Mn ratio: 1.8 to 7.0

Mn is also an element causing precipitation of Al—(Fe.Mn)—Si and other Fe-based intermetallic compounds in the cast ingot at the time of casting, but has the effect of making the shape of the Fe-based intermetallic compounds spheroidal.

If the Fe/Mn ratio is less than 1.8, at the time of homogenization, the effect of the Fe-based intermetallic compounds absorbing the Mn in solid solution at the matrix becomes smaller and, for the final sheet, the value of elongation after cold rolling by a rolling reduction of 90% is liable to become less than 5.0%. If the Fe/Mn ratio is over 7.0, the effect of making the shape of the Fe-based intermetallic compounds spheroidal becomes smaller and the value of elongation after cold rolling the final sheet by a rolling reduction of 90% is liable to become less than 5.0%.

Therefore, the Fe/Mn ratio is restricted to 1.8 to 7.0.

Ti: 0.002 to 0.15 Mass %

Ti acts as a grain refining agent at the time of casting the cast ingot and can prevent casting cracks, so is an essential element. Of course, Ti may also be added alone, but by making it copresent with B, a further powerful effect of refinement of the grains can be expected. Therefore, Ti may also be added in the form of Al-5% Ti-1% B or another rod hardener.

If the Ti content is less than 0.002 mass %, the effect of refinement at the time of casting the cast ingot is insufficient, so casting cracks are liable to be invited. If the Ti content is over 0.15 mass %, at the time of casting the cast ingot, $TiAl_3$ and other coarse intermetallic compounds precipitate and the value of elongation after cold rolling the final sheet by a rolling reduction of 90% is liable to become less than 5.0%.

Therefore, the Ti content is made 0.002 to 0.15 mass % in range. The preferable Ti content is 0.002 to 0.08 mass % in range. The more preferable Ti content is 0.005 to 0.06 mass % in range.

Note that, for the Ti content, the more preferable range is prescribed by restricting both the lower limit value and upper limit value of the preferable range, but the more preferable range can be applied independently to each of the lower limit value and upper limit value. It is not necessary to apply it to only both simultaneously.

B: Less than 0.04 Mass %

B, by copresence with Ti, leads to a more powerful effect of refinement of the grains, so is an essential element. Like Ti, Al-5% Ti-1% B or another rod hardener may also be added.

If the B content is 0.04 mass % or more, while depending also on the Ti content, the Ti—B compound stabilizes and easily becomes $TiB_2$, the effect of refinement of the grains weakens, and $TiB_2$ is liable to precipitate in the furnace and deposit at the furnace bottom.

Therefore, the B content is made less than 0.04 mass % in range. The preferable B content is less than 0.02 mass % in range. The more preferable B content is less than 0.01 mass % in range.

V: Less than 0.03 Mass %

In the present invention, V is an impurity. If the V content is 0.03 mass % or more, at the time of casting, relatively large size Fe-based intermetallic compounds are made to precipitate and the value of elongation after cold rolling by a rolling reduction of 90% is liable to become less than 5.0%.

Therefore, the V content is made less than 0.03 mass % in range. The preferable V content is less than 0.02 mass % in range.

Si: Less than 0.40 Mass %

In the present invention, Si is an impurity. Si causes Al—(Fe.Mn)—Si and other Fe-based intermetallic compounds to precipitate at the time of casting and partially forms a solid solution in the matrix to raise the strength of the aluminum alloy sheet.

If the Si content is 0.40 mass % or more, in the final sheet, the amount of Si in solid solution becomes higher and the value of elongation after cold rolling by a rolling reduction of 90% is liable to become less than 5.0%.

Therefore, the Si content is made a range of less than 0.40 mass %. The preferable Si content is a range of less than 0.35 mass %. The more preferable Si content is a range of less than 0.30 mass %.

Cu: Less than 0.03 Mass %

In the present invention, Cu is an impurity. In the present invention, if the Cu content is 0.03 mass % or more, the value of elongation after cold rolling by a rolling reduction of 90% is liable to become less than 5.0%. Therefore, the content of Cu is made less than 0.03 mass % in range. The preferable Cu content is less than 0.02 mass % in range. The more preferable Cu content is less than 0.01 mass % in range.

Mg: Less than 0.05 Mass %

In the present invention, Mg is an impurity. In the present invention, if the Mg content is 0.05 mass % or more, the final sheet falls in formability, the work hardening at a high working rate becomes remarkable, and value of elongation after cold rolling by a rolling reduction of 90% is liable to become less than 5.0%. Therefore, the content of Mg is made less than 0.05 mass % in range. The preferable Mg content is less than 0.03 mass % in range. The more preferable Mg content is less than 0.02 mass % in range.

Other Unavoidable Impurities

Unavoidable impurities are uncontrolled elements unavoidably mixed in from the raw material metal, recycled material, etc. The allowable contents are, for example, Cr: less than 0.20 mass %, Zn: less than 0.20 mass %, Ni: less than 0.10 mass %, Ga: less than 0.05 mass %, Pb, Bi, Sn, Na, Ca, Sr: respectively less than 0.02 mass %, and others (for example, Co, Nb, Mo, and W): respectively less than 0.05 mass %. Even if these uncontrolled elements are included in the above ranges, they do not inhibit the effect of the present invention.

Tensile Strength: 95 MPa or More

As explained above, a battery with an integrated explosion-proof valve requires, as a material, an aluminum alloy sheet having suitable strength. Therefore, as an indicator for evaluation of the strength, the tensile strength (MPa) is employed. The tensile strength was defined as 95 MPa or more.

Value of (TS95−TS80): Less than −3 MPa

As explained above, an aluminum alloy sheet for battery lid use for forming an integrated explosion-proof valve has to be excellent in work softenability at a high working rate as the material for a battery lid with an integrated explosion-proof valve, since it is cold worked by a working rate of 80% to 95% or so to form a thin part. Therefore, as an indicator for evaluation of the work softenability, the value (MPa) of (TS95−TS80) when defining a tensile strength after cold rolling by a rolling reduction of 80% as TS80 and defining a tensile strength after cold rolling by a rolling reduction of 95% as TS95 is employed. The value of (TS95−TS80) was defined as less than −3 MPa.

Value of Elongation: 40% or More

As explained above, an aluminum alloy sheet for battery lid use for forming an integrated explosion-proof valve has to be excellent in formability since when forming the integrated explosion-proof valve, it is cold worked by a working rate of 80% to 95% or so to form a thin part. Therefore, as an indicator for evaluation of the formability, the value of elongation of the final sheet at the time of conducting a tensile test is employed. The value of elongation was defined as 40% or more.

Having Recrystallized Structure

To make the thin part of the integrated explosion-proof valve excellent in cyclic fatigue characteristic, the final sheet has to be made one having a predetermined component composition and having a recrystallized structure. If the metal structure of the final sheet is a nonrecrystallized structure, the softening by the annealing treatment will be insufficient, the value of elongation will be low, and the formability will remarkably fall. Further, even if the integrated explosion-proof valve could be formed, the anisotropy of the metal structure of the thin part is liable to become a factor behind variation in the operating pressure.

If the metal structure of the final sheet is a recrystallized structure, if the average grain size of the recrystallized grains exceeds 30 μm, the variation in operating pressure of the explosion-proof valve is liable to become larger, so this is not preferable. If the average grain size of the recrystallized grains is less than 15 μm, the heat radiation ability is liable to fall, so this is not preferable. Therefore, the preferable average grain size of the recrystallized grains of the recrystallized structure is 15 to 30 μm in range. The more preferable average grain size of the recrystallized grains of the recrystallized structure is 15 to 25 μm in range.

Value of Elongation after Cold Rolling by Rolling Reduction of 90%: 5.0% or More As explained above, a car-mounted lithium ion battery generates a large amount of heat internally at the time of charging and discharging, so the internal pressure acting on the thin part of the integrated explosion-proof valve repeatedly changes with each charging and discharging. Therefore, the material is preferably one which is high in elongation and excellent in cyclic fatigue characteristics at the thin part after forming the integrated explosion-proof valve. Therefore, as an indicator for evaluation of the operating stability of the explosion-proof valve, a value of elongation after cold rolling the final sheet by a rolling reduction of 90% is employed. The value of the elongations is defined as being 5.0% or more.

Next, one example of the method for producing such an aluminum alloy sheet for battery lid use for forming an integrated explosion-proof valve will be simply introduced.

Melting and Refining Process

The melting furnace is charged with the raw materials. After reaching a predetermined melting temperature, flux is suitably charged and the mixture stirred. Furthermore, according to need, a lance etc. is used to degasify the inside of the furnace, then the melt is held to settle and the slag is separated from the surface.

In this melting and refining, to obtain predetermined alloy constituents, it is important to again charge the master alloy and other raw materials, but it is extremely important to ensure a sufficient settling time until the above flux and slag float up to the melt surface and are separated from the aluminum alloy melt. The settling time taken is usually preferably 30 minutes or more.

The aluminum alloy melt refined in the melting furnace is sometimes transferred once to a holding furnace, then cast, but sometimes is directly tapped and cast from the melting furnace. The more preferable settling time is 45 minutes or more.

In accordance with need, the melt may also be degassed in-line and passed through a filter.

The in-line degassing is mainly of the type blowing inert gas etc. into the aluminum melt from a rotating rotor and making the hydrogen gas in the melt diffuse in the bubbles of inert gas for removal. If using nitrogen gas as the inert gas, it is important to control the dew point to for example −60° C. or less. The amount of hydrogen gas of the cast ingot is preferably reduced to 0.20 cc/100 g or less.

If the amount of hydrogen gas of the cast ingot is large, porosity is liable to form at the final solidified part of the cast ingot, so it is preferable to restrict the rolling reduction per pass in the hot rolling process to for example 7% or more to crush the porosity. Further, the hydrogen gas contained in the cast ingot supersaturated in solid solution, while depending on the heat treatment conditions of the cold rolled coil, will sometimes precipitate and cause the formation of a large number of blow holes at the bead even after press forming the explosion-proof valve of the final sheet, for example, at the time of laser welding the battery lid with the battery container. For this reason, the more preferable amount of hydrogen gas of the cast ingot is 0.15 cc/100 g or less.

Slab Casting Process

A cast ingot is produced by semicontinuous casting (DC casting). In the case of usual semicontinuous casting, the thickness of the cast ingot is in general 400 to 600 mm or so, so the solidification cooling rate at the center part of the cast ingot is 1° C./sec or so. For this reason, in particular when semicontinuously casting an aluminum alloy melt with high contents of Fe and Mn, at the center part of the cast ingot, $Al_6$(Fe.Mn), α-Al—(Fe.Mn)—Si, and other relatively coarse intermetallic compounds tend to precipitate from the aluminum alloy melt.

The casting speed in semicontinuous casting, while depending on the width and thickness of the cast ingot as well, is usually, considering also the productivity, 50 to 70 mm/min. However, if performing in-line degassing, if considering the de facto dwell time of the melt in the degassing tank, while depending also on the flow rate of the inert gas and other degassing conditions, the smaller the flow rate of the aluminum melt (amount of supply of melt per unit time), the better degassing efficiency in the tank and the more the amount of hydrogen gas of the cast ingot can be reduced. While depending also on the number of pourings in the casting, to reduce the amount of hydrogen gas of a cast ingot, it is desirable to restrict the casting speed to 30 to 50 mm/min. The more desirable casting speed is 30 to 40 mm/min. Of course, if the casting speed is less than 30 mm/min, the productivity falls, so this is not preferable. Note that with a slower casting speed, the slant of the sump at the cast ingot (boundary between solid phase and liquid phase) becomes more moderate and casting cracks can be prevented needless to say.

Homogenization Process

The cast ingot obtained by casting by the semicontinuous casting method is homogenized.

The homogenization is treatment performed for facilitating rolling by holding the cast ingot at a high temperature to eliminate casting segregation and residual stress inside the cast ingot. In the present invention, the ingot must be held at a holding temperature of 520 to 620° C. for 1 hour or more. In this case, this is also treatment for making the transition elements etc. forming the intermetallic compound precipitating at the time of casting form a solid solution in the matrix to a certain extent. If this holding temperature is too low or if the holding time is short, the above formation of a solid solution does not proceed and the outer skin after forming is liable to not be finished beautifully. Further, if the holding temperature is too high, the micro final solidified part of the cast ingot, that is, the eutectic part, melts. So-called burning is liable to occur. The more preferable homogenization temperature is 520 to 610° C.

Hot Rolling Process

By homogenizing the cast ingot by holding it at a 520 to 620° C. holding temperature for a 1 hour or more holding time and setting the start temperature of the hot rolling to less than 520° C., it becomes possible to decrease the Mn and Si in solid solution in the matrix. If the start temperature of the hot rolling is 520° C. or more, it becomes difficult to decrease the Mn and Si in solid solution in the matrix. If the start temperature of the hot rolling is less than 420° C., the roll pressure required for plastic deformation at the time of the hot rolling becomes higher and the rolling reduction per pass becomes too low thereby causing the productivity to drop. Therefore, the start temperature of the hot rolling is 420 to less than 520° C. in range. The cast ingot taken out from inside the soaking furnace is suspended as it is by a crane and brought over to the hot rolling machine. While depending on the type of the hot rolling machine, usually the ingot is hot rolled by several rolling passes to obtain hot rolled sheet of a predetermined thickness, for example, 4 to 8 mm or so, which is then taken up in a coil.

Cold Rolling Process

The coil in which the hot rolled sheet was taken up is run through a cold rolling machine and cold rolled for several passes. At this time, the plastic strain introduced due to the cold rolling causes work hardening, so interannealing is performed in accordance with need. Usually, interannealing is also softening treatment, so while depending on the material, the cold rolled coil may also be inserted into a batch furnace and held there at a 300 to 400° C. temperature for 1 hour or more. If the holding temperature is lower than 300° C., softening is not promoted, while if the holding temperature exceeds 400° C., the productivity may fall, so this is not preferable.

Final Annealing Process

In the present invention, the final annealing process performed after the final cold rolling is, for example, preferably batch treatment holding the sheet by an annealing furnace at a temperature of 300 to 450° C. for 1 hour or more. By performing the final annealing under such conditions, the annealed sheet (final sheet) is given a recrystallized structure with an average grain size of the recrystallized grains of 15 to 30 μm. The more preferable final annealing process is batch treatment by an annealing furnace at a temperature of 300 to 400° C. for 1 hour or more. The still more preferable final annealing process is batch treatment by an annealing furnace at a temperature of 300 to 380° C. for 1 hour or more. The higher the holding temperature at the annealing furnace, the faster the speed of growth of the recrystallized grains, so the larger the average grain size of the recrystallized grains becomes. Whatever the case, in the present invention, final annealing is essential. If considering the cold working rate of 80% to 95% or so of the thin part of the integrated explosion-proof valve formed by press forming, the final sheet has to be made to soften. Note that, if performing the final annealing process by continuous annealing, the heat radiation ability of the annealed sheet (final sheet) and the operating stability of the integrated explosion-proof valve is liable to fall, so this is not preferable.

The final cold rolling reduction in the case of performing final annealing is preferably 50% to 95% in range. The more preferable final cold rolling rate is 70 to 95% in range. If the final cold rolling rate is in this range, by performing final annealing by holding the sheet at 300 to 450° C. in temperature for 1 hour or more, the result becomes a recrystallized structure with an average grain size of 15 to 30 μm. Note that, the average grain size of the recrystallized grains changes not only due to the holding temperature in the annealing furnace, but also the final cold rolling reduction.

By going through the normal process such as explained above, it is possible to obtain aluminum alloy sheet for battery lid use for forming an integrated explosion-proof valve.

EXAMPLES

Examples by Laboratory Test Samples

Preparation of Test Samples

Ingots of 16 levels (Examples 1 to 6 and Comparative Examples 1 to 10) of component compositions and of 5 kg weights were respectively placed in #20 crucibles. The crucibles were heated in a small electric furnace to melt the ingots. Next, lances were inserted into the melts and $N_2$ gas was blown in by a flow rate of 1.0 L/min for 5 minutes for degassing. After that, the melts were allowed to settle for 30 minutes and the slag floating up on the surfaces was removed by stirring rods. Next, the crucibles were taken out from the small size electric furnace and the melts were cast into inside dimension 250×200×30 mm molds to prepare cast ingots. Test samples of Examples 1 to 6 and Comparative Examples 1 to 10 were obtained from the melts in the crucibles. The disk samples of these test samples were analyzed for composition by emission spectroscopy. The results are shown in Table 1.

TABLE 1

Results of Analysis of Component Compositions of Test Samples

| | Component composition (mass %) | | | | | | | | | |
|---|---|---|---|---|---|---|---|---|---|---|
| | Si | Fe | Cu | Mn | Mg | Ti | B | V | Fe/Mn | Al |
| Ex. 1 | 0.07 | 1.22 | <0.01 | 0.50 | 0.01 | 0.019 | 0.0028 | 0.01 | 2.44 | bal. |
| Ex. 2 | 0.07 | 1.30 | <0.01 | 0.50 | 0.01 | 0.005 | <0.0005 | 0.01 | 2.60 | bal. |
| Ex. 3 | 0.07 | 1.31 | <0.01 | 0.44 | 0.01 | 0.021 | <0.0005 | 0.01 | 2.98 | bal. |
| Ex. 4 | 0.07 | 1.24 | <0.01 | 0.50 | 0.02 | 0.018 | 0.003 | 0.02 | 2.48 | bal. |
| Ex. 5 | 0.25 | 1.25 | <0.01 | 0.51 | 0.02 | 0.016 | 0.003 | 0.01 | 2.45 | bal. |
| Ex. 6 | 0.07 | 1.21 | <0.01 | 0.20 | 0.02 | 0.019 | 0.002 | 0.01 | 6.05 | bal. |
| Comp. Ex. 1 | 0.07 | 1.58 | <0.01 | 0.51 | 0.01 | 0.014 | 0.0028 | 0.01 | 3.10 | bal. |
| Comp. Ex. 2 | 0.07 | 0.97 | <0.01 | 0.51 | 0.01 | 0.014 | 0.0028 | 0.01 | 1.90 | bal. |
| Comp. Ex. 3 | 0.07 | 1.24 | 0.04 | 0.50 | 0.02 | 0.018 | 0.002 | 0.01 | 2.48 | bal. |
| Comp. Ex. 4 | 0.07 | 1.23 | <0.01 | 0.80 | 0.02 | 0.020 | 0.003 | 0.01 | 1.54 | bal. |
| Comp. Ex. 5 | 0.03 | 1.23 | <0.01 | 0.51 | 0.21 | 0.019 | 0.002 | 0.01 | 2.41 | bal. |
| Comp. Ex. 6 | 0.07 | 1.24 | <0.01 | 0.51 | 0.02 | 0.018 | 0.003 | 0.04 | 2.43 | bal. |
| Comp. Ex. 7 | 0.07 | 1.22 | <0.01 | 0.51 | 0.02 | 0.019 | 0.002 | 0.11 | 2.39 | bal. |
| Comp. Ex. 8 | 0.07 | 1.22 | <0.01 | 0.50 | 0.02 | 0.019 | 0.002 | 0.01 | 2.44 | bal. |
| Comp. Ex. 9 | 0.14 | 0.19 | 0.02 | 0.02 | 0.02 | 0.020 | 0.0027 | 0.01 | 9.50 | bal. |
| Comp. Ex. 10 | 0.18 | 0.20 | 0.14 | 1.29 | 0.02 | 0.019 | 0.0024 | 0.01 | 0.16 | bal. |

*) In the Table, underlined values show values outside prescribed range of present invention.

These cast ingots were cut at their two surfaces by 5 mm each to make them thicknesses of 20 mm, then were consecutively homogenized at 590° C.×1 hour and 480° C.×1 hour and hot rolled to obtain thickness 6.0 mm hot rolled sheets. After this, the hot rolled sheets were cold rolled to obtain sheet thickness 1.0 mm cold rolled sheets. During the cold rolling process, no interannealing was performed. The final cold rolling reduction in this case was 83%.

Next, these cold rolled sheets (Examples 1 to 6 and Comparative Examples 1 to 7, 9, and 10) were inserted into an annealer and annealed for 340° C.×1 hour simulating batch annealing to obtain final sheets (0 materials). The other cold rolled sheet (Comparative Example 8) was heated by a salt bath at 425° C.×15 seconds simulating continuous annealing at 425° C.×10 seconds, then water cooled to obtain the final sheet (0 material).

Furthermore, these final sheets were cold rolled down to 0.2 mm, 0.1 mm, and 0.05 mm simulating formation of integrated explosion-proof valves for the purpose of investigating the work hardening characteristic etc. Cold rolled materials were sampled at respective rolling reductions of 80%, 90%, and 95%.

Next, the thus obtained test samples (final sheets: 16 levels, cold rolled materials: 16 levels×3 levels each) were measured and evaluated for various properties.

Measurement of Properties by Tensile Tests

The strengths of the obtained final sheets were evaluated by the tensile strengths (MPa) of the final sheets (O materials). The formabilities of the obtained final sheets were evaluated by the values of elongation of the final sheets (O materials) (%). The work softenabilities of the final sheets were evaluated by the values (TS95−TS80) (MPa) of the tensile strengths TS95 (MPa) after cold rolling the final sheets (0 materials) by a rolling reduction of 95% minus the tensile strengths TS80 (MPa) after cold rolling the final sheets (0 materials) by a rolling reduction of 80%. The operating stabilities of the integrated explosion-proof valves were evaluated by the values of elongation (%) after cold rolling the final sheets (0 materials) by a rolling reduction of 90%. Specifically, from the obtained test samples, JIS No. 5 test pieces were taken so that the tensile directions became parallel directions to the rolling direction. Tensile tests were conducted in accordance with JIS Z2241 to find the tensile strengths, 0.2% yield strengths, and elongations (elongations at break). Note that, these tensile tests were performed three times for each test sample (n=3) and the average values were calculated. The results of measurement of the tensile strengths and elongations (elongations at break) of the final sheets, the results of measurement of the tensile strengths after cold rolling the final sheets by a rolling reduction of 80%, the results of measurement of the elongations (elongations at break) after cold rolling the final sheets by a rolling reduction of 90%, and the results of measurement of the tensile strengths after cold rolling the final sheets by a rolling reduction of 95% are shown in Table 2.

Final sheets with a tensile strength of 100 MPa or more were evaluated as good in strength (Good), while final sheets with a tensile strength of less than 100 MPa were evaluated as poor in strength (Poor).

Final sheets with a value of elongation of 35.0% or more were evaluated as good in formability (Good), while final sheets with a value of elongation of less than 35.0% were evaluated as poor in formability (Poor).

Final sheets with a value of (TS95−TS80) of less than 10 MPa were evaluated as good in work softenability (Good), while final sheets with a value of (TS95−TS80) of 10 MPa or more were evaluated as poor in work softenability (Poor).

Final sheets with a value of elongation after cold rolling by a rolling reduction of 90% of 4.0% or more were evaluated as good in operating stability (Good), while final sheets with a value of elongation after cold rolling by a rolling reduction of 90% of less than 4.0% were evaluated as poor in operating stability (Poor). The results of evaluation are shown in Table 2.

TABLE 2

Results of Evaluation of Properties of Test Samples

| | Rolling reduction | | | | | | | | | |
|---|---|---|---|---|---|---|---|---|---|---|
| | 0% | | | | 90% | | | | | |
| | Final sheet tensile strength (MPa) | Final sheet elongation (%) | 80% Cold rolled material tensile strength (MPa) | 95% Cold rolled material tensile strength (MPa) | TS95-TS80 (MPa) | Cold rolled material elongation (%) | Evaluation | | | |
| | | | | | | | Strength | Formability | Work softenability | Operating stability |
| Ex. 1 | 111 | 38.7 | 195 | 201 | 6 | 4.8 | Good | Good | Good | Good |
| Ex. 2 | 126 | 36.7 | 195 | 202 | 7 | 4.6 | Good | Good | Good | Good |
| Ex. 3 | 122 | 39.0 | 194 | 198 | 4 | 5.0 | Good | Good | Good | Good |
| Ex. 4 | 126 | 37.0 | 195 | 204 | 9 | 4.8 | Good | Good | Good | Good |
| Ex. 5 | 111 | 41.4 | 191 | 196 | 5 | 6.0 | Good | Good | Good | Good |
| Ex. 6 | 105 | 39.9 | 188 | 196 | 8 | 5.5 | Good | Good | Good | Good |
| Comp. Ex. 1 | 127 | _32.6_ | 196 | 202 | 6 | _3.2_ | Good | Poor | Good | Poor |
| Comp. Ex. 2 | 114 | 40.4 | 190 | 202 | _12_ | 4.0 | Good | Good | Poor | Good |
| Comp. Ex. 3 | 112 | 38.9 | 201 | 209 | 8 | _3.6_ | Good | Good | Good | Poor |
| Comp. Ex. 4 | 115 | 35.8 | 199 | 207 | 8 | _3.3_ | Good | Good | Good | Poor |
| Comp. Ex. 5 | 121 | _33.3_ | 223 | 252 | _29_ | _2.2_ | Good | Poor | Poor | Poor |
| Comp. Ex. 6 | 126 | 36.4 | 197 | 205 | 8 | _3.3_ | Good | Good | Good | Poor |
| Comp. Ex. 7 | 113 | 39.6 | 199 | 203 | 4 | _3.4_ | Good | Good | Good | Poor |
| Comp. Ex. 8 | 104 | 40.2 | 203 | 222 | 19 | _3.5_ | Good | Good | Poor | Poor |
| Comp. Ex. 9 | _89_ | 41.5 | 166 | 184 | _18_ | _2.8_ | Poor | Good | Poor | Poor |
| Comp. Ex. 10 | 129 | 35.9 | 233 | 259 | _26_ | _3.0_ | Good | Good | Poor | Poor |

\*) In the Table, underlined values show values outside prescribed range of present invention.

Examples 1 to 6 in Table 2 showing the results of evaluation of the properties of the test samples were within the scope of composition of the present invention. Also, the final annealing was batch annealing and the tensile strengths of the final sheets, the values of elongation of the final sheets, the values of (TS95–TS80), and the values of elongation after cold rolling the final sheets by a rolling reduction of 90% all satisfied the reference values. Specifically, Examples 1 to 6 had tensile strengths of the final sheets of 100 MPa or more, values of elongation of the final sheets of 35.0% or more, values of (TS95–TS80) of less than 10 MPa, and values of elongation after cold rolling the final sheets by a rolling reduction of 90% of 4.0% or more. Therefore, Examples 1 to 6 were evaluated as good in strength (Good), were evaluated as good in formability (Good), were evaluated as good in work softenability (Good), and were evaluated as good in operating stability (Good).

Comparative Examples 1 to 7, 9, and 10 in Table 2 were outside the scope of composition of the present invention although the final annealing was batch annealing. At least one of the tensile strengths of the final sheets, the values of elongation of the final sheets, the values of (TS95–TS80), and the values of elongation after cold rolling the final sheets by a rolling reduction of 90% failed to satisfy the reference values.

Comparative Example 1 had an Fe content of 1.58 mass % or too high, so both of the value of elongation of the final sheet and the value of elongation after cold rolling the final sheet by a rolling reduction of 90% failed to satisfy the reference values, the sheet was evaluated as poor in formability (Poor), and the sheet was evaluated as poor in operating stability (Poor).

Comparative Example 2 had an Fe content of 0.97 mass % or too low, so the value of (TS95–TS80) failed to satisfy the reference value and the sheet was evaluated as poor in work softenability (Poor).

Comparative Example 3 had a Cu content of 0.04 mass % or too high, so the value of elongation after cold rolling the final sheet by a rolling reduction of 90% failed to satisfy the reference value and the sheet was evaluated as poor in operating stability (Poor).

Comparative Example 4 had an Mn content of 0.80 mass % or too high, so the value of elongation after cold rolling the final sheet by a rolling reduction of 90% failed to satisfy the reference values and the sheet was evaluated as poor in operating stability (Poor).

Comparative Example 5 had an Mg content of 0.21 mass % or too high, so the value of elongation of the final sheet, the value of (TS95–TS80), and the value of elongation after cold rolling the final sheet by a rolling reduction of 90% all failed to satisfy the reference values, the sheet was evaluated as poor in formability (Poor), the sheet was evaluated as poor in work softenability (Poor), and the sheet was evaluated as poor in operating stability (Poor).

Comparative Example 6 had a V content of 0.04 mass % or too high, so the value of elongation after cold rolling the final sheet by a rolling reduction of 90% failed to satisfy the reference value and the sheet was evaluated as poor in operating stability (Poor).

Comparative Example 7 had a V content of 0.11 mass % or too high, so the value of elongation after cold rolling the final sheet by a rolling reduction of 90% failed to satisfy the reference value and the sheet was evaluated as poor in operating stability (Poor).

Comparative Example 8 was inside the scope of composition of the present invention, but the final annealing was annealing in a salt bath simulating continuous annealing, so the value of (TS95–TS80) and the value of elongation after cold rolling the final sheet by a rolling reduction of 90% all failed to satisfy the reference values, the sheet was evaluated as poor in work softenability (Poor), and the sheet was evaluated as poor in operating stability (Poor).

Comparative Example 9 is an AA1050 alloy composition. Its Fe content and Mn content are respectively 0.19 mass % and 0.02 mass % or too low, so the tensile strength of the final sheet, the value of (TS95–TS80), and the value of elongation after cold rolling the final sheet by a rolling reduction of 90% all failed to satisfy the reference values, the sheet was evaluated as poor in strength (Poor), the sheet was evaluated as poor in work softenability (Poor), and the sheet was evaluated as poor in operating stability (Poor).

Comparative Example 10 is an AA3003 alloy composition. Its Fe content is 0.20 mass % or too low, while its Cu content and Mn content are respectively 0.14 mass % and 1.29 mass % or too high, so the value of (TS95−TS80) and the value of elongation after cold rolling the final sheet by a rolling reduction of 90% all failed to satisfy the reference values, the sheet was evaluated as poor in work softenability (Poor), and the sheet was evaluated as poor in operating stability (Poor).

Examples by Actual Machinery and Materials

Preparation of Test Sample

A melt of the composition shown in Table 3 was refined in a melting furnace and cast by a DC casting machine into a width 1200 mm×thickness 560 mm×length 3800 mm cast ingot. This cast ingot was cut at its two surfaces and inserted into a soaking furnace for heating. It was successively homogenized at 590° C.×1 hour and 480° C.×1 hour, then was hot rolled to obtain a thickness 7.0 mm hot rolled sheet which was then taken up in a coil. After this, the hot rolled sheet was cold rolled to obtain a thickness 1.0 mm cold rolled sheet which was then taken up in a coil. The final cold rolling rate in this case was 86%. From this cold rolled sheet, a cut sheet of suitable dimensions was obtained.

TABLE 3

Results of Analysis of Component Compositions of Test Samples

| | Conponent composition (mass %) | | | | | | | | | |
|---|---|---|---|---|---|---|---|---|---|---|
| | Si | Fe | Cu | Mn | Mg | Ti | B | V | Fe/Mn | Al |
| Ex. 50 | 0.07 | 1.20 | <0.01 | 0.48 | <0.01 | 0.011 | 0.004 | 0.01 | 2.50 | bal. |

Next, the cold rolled sheet from which this cut sheet was taken was inserted into an annealer where it was annealed at 240° C., 340° C., and 440° C.×1 hour each simulating batch annealing to obtain a final sheet (0 material). Other cold rolled sheets were heated in a salt bath at 425° C.×15 seconds and 520° C.×10 seconds simulating continuous annealing at 425° C.×10 seconds and 520° C.×5 seconds respectively, then water cooled to obtain the final sheets (0 materials).

Furthermore, these final sheets were cold rolled to 0.2 mm, 0.1 mm, and 0.05 mm simulating formation of an integrated explosion-proof valve for the purpose of investigating the work hardening characteristic etc. Cold rolled materials having rolling reductions of 80%, 90%, and 95% were taken.

Next, these obtained test samples (final sheets: 5 levels, cold rolled materials: 5 levels×3 levels each) were measured and evaluated for properties.

Measurement of Properties by Tensile Test

The strengths of the obtained final sheets were evaluated by the tensile strengths (MPa) of the final sheets (O materials). The formabilities of the obtained final sheets were evaluated by the values of elongation of the final sheets (O materials) (%). The work softenabilities of the final sheets were evaluated by the values (TS95−TS80) (MPa) of the tensile strengths TS95 (MPa) after cold rolling the final sheets (O materials) by a rolling reduction of 95% minus the tensile strengths TS80 (MPa) after cold rolling the final sheets (O materials) by a rolling reduction of 80%. The operating stabilities of the integrated explosion-proof valves were evaluated by the values of elongation (%) in the tensile tests after cold rolling the final sheets (O materials) by a rolling reduction of 90%. Specifically, from the obtained test samples, JIS No. 5 test pieces were taken so that the tensile directions became parallel directions to the rolling direction. Tensile tests were conducted in accordance with JIS Z2241 to find the tensile strengths, 0.2% yield strengths, and elongations (elongations at break). Note that, these tensile tests were performed three times for each test sample (n=3) and the average values were calculated. The results of measurement of the tensile strengths and elongations (elongations at break) of the final sheets, the results of measurement of the tensile strengths after cold rolling the final sheets by a rolling reduction of 80%, the results of measurement of the elongations (elongations at break) after cold rolling the final sheets by a rolling reduction of 90%, and the results of measurement of the tensile strengths after cold rolling the final sheets by a rolling reduction of 95% are shown in Table 4.

Measurement of Average Grain Size of Recrystallized Grains

Pieces of the obtained final sheets were cut out, were buried in a thermoplastic resin to enable the rolling surfaces of the sheets (L-LT surfaces) to be polished, and were polished to mirror finishes. The sheets were anodized in a borohydrofluoric acid aqueous solution and examined for metal structures by a polarized light microscope (magnification 50×). The obtained final sheets were measured for average grain size of the recrystallized grains by the slice method (cutting method). The gradations of the field of the polarized light microscope were successively shifted while drawing a virtual line of a length of 12.1 mm in the field. At that time, the number (n) of grain boundaries which the virtual line cut across was measured and formula (1) was used to calculate the average grain size (μm).

$$\{12.1 \times 10^3/(n-1)\} \qquad (1)$$

This measurement was performed two times for each final sheet. The average value of the two measured values was employed. The results of measurement of the average grain sizes of the recrystallized grains of the final sheets are shown in Table 4.

A final sheet with a tensile strength of 95 MPa or more was evaluated as good in strength (Good), while a final sheet with a tensile strength of less than 95 MPa was evaluated as poor in strength (Poor).

A final sheet with a value of elongation of 40.0% or more was evaluated as good in formability (Good), while a final sheet with a value of elongation of less than 40.0% was evaluated as poor in formability (Poor).

A final sheet with a value of (TS95−TS80) of less than −3 MPa was evaluated as good in work softenability (Good), while a final sheet with a value of (TS95−TS80) of −3 MPa or more was evaluated as poor in work softenability (Poor).

A final sheet with a value of elongation after cold rolling by a rolling reduction of 90% of 5.0% or more was evaluated as good in operating stability (Good), while a final sheet with a value of elongation after cold rolling by a rolling reduction of 90% of less than 5.0% was evaluated as poor in operating stability (Poor). The results of evaluation of these are shown in Table 4.

TABLE 4

Results of Evaluation of Properties of Test Samples

| | | Rolling reduction | | | | | | | | | |
|---|---|---|---|---|---|---|---|---|---|---|---|
| | | 0% | | 80% | 95% | 90% | | | | | |
| | | Final sheet tensile | Final sheet | Cold rolled material tensile | T595- | Cold rolled material | Average grain | | Evaluation | | |
| | Annealing conditions | strength (MPa) | elongation (%) | strength (MPa) | T580 (MPa) | elongation (%) | size (μm) | Strength | Forma-bility | Work softenability | Operating stability |
| Ex. 51 | Annealer 340° C.-1 hr | 114 | 44.0 | 189 | 183 | −6 | 6.1 | 16.0 | Good | Good | Good | Good |
| Ex. 52 | Annealer 440° C.-1 hr | 110 | 45.4 | 187 | 180 | −7 | 6.4 | 29.1 | Good | Good | Good | Good |
| Comp. Ex. 53 | Annealer 240° C.-1 hr | 135 | 26.5 | 187 | 185 | −2 | 6.6 | — | Good | Poor | Poor | Good |
| Comp. Ex. 54 | Salt bath 425° C.-15 sec | 111 | 44.3 | 196 | 197 | 1 | 4.8 | 13.6 | Good | Good | Poor | Poor |
| Comp. Ex. 55 | Salt bath 520° C.-10 sec | 115 | 42.3 | 196 | 195 | −1 | 4.5 | 12.0 | Good | Good | Poor | Poor |

*) In the table, Comparative Example 53 was a nonrecrystallized structure, so the average grain size could not be measured.

Example 51 in Table 4 showing the result of evaluation of the properties of the test sample was within the scope of composition of the present invention. Also, the final annealing was annealer annealing simulating batch annealing at a holding temperature of 340° C. and holding time of 1 hour. Each of the tensile strength of the final sheet, the value of elongation of the final sheet, the value of (TS95−TS80), and the value of elongation after cold rolling the final sheet by a rolling reduction of 90% all satisfied the reference values. Specifically, Example 51 had a tensile strength of the final sheet of 95 MPa or more, a value of elongation of the final sheet of 40.0% or more, a value of (TS95−TS80) of less than −3 MPa, and a value of elongation after cold rolling the final sheet by a rolling reduction of 90% of 5.0% or more. Therefore, Example 51 was evaluated as good in strength (Good), was evaluated as good in formability (Good), was evaluated as good in work softenability (Good), and was evaluated as good in operating stability (Good). Further, the final sheet of Example 51 exhibited a recrystallized structure and had an average grain size of the recrystallized grains of 16.0 μm.

Example 52 in Table 4 showing the result of evaluation of the properties of the test sample was within the scope of composition of the present invention. Also, the final annealing was annealer annealing simulating batch annealing at a holding temperature of 440° C. and holding time of 1 hour. Each of the tensile strength of the final sheet, the value of elongation of the final sheet, the value of (TS95−TS80), and the value of elongation after cold rolling the final sheet by a rolling reduction of 90% all satisfied the reference values. Specifically, Example 52 had a tensile strength of the final sheet of 95 MPa or more, a value of elongation of the final sheet of 40.0% or more, a value of (TS95−TS80) of less than −3 MPa, and a value of elongation after cold rolling the final sheet by a rolling reduction of 90% of 5.0% or more. Therefore, Example 52 was evaluated as good in strength (Good), was evaluated as good in formability (Good), was evaluated as good in work softenability (Good), and was evaluated as good in operating stability (Good). Further, the final sheet of Example 52 exhibited a recrystallized structure and had an average grain size of the recrystallized grains of 29.1 μm.

Comparative Example 53 in Table 4 showing the result of evaluation of the properties of the test sample was within the scope of composition of the present invention. Also, the final annealing was annealer annealing simulating batch annealing at a holding temperature of 240° C. and holding time of 1 hour. The tensile strength of the final sheet and the value of elongation after cold rolling the final sheet by a rolling reduction of 90% satisfied the reference values, but the value of elongation of the final sheet and the value of (TS95−TS80) failed to satisfy the reference values. Specifically, Comparative Example 53 had a tensile strength of the final sheet of 95 MP or more and a value of elongation after cold rolling the final sheet by a rolling reduction of 90% of 5.0% or more, but a value of elongation of the final sheet of less than 40.0% and a value of (TS95−TS80) of −3 MPa or more. Therefore, Comparative Example 53 was evaluated as good in strength (Good), was evaluated as poor in formability (Poor), was evaluated as poor in work softenability (Poor), and was evaluated as good in operating stability (Good). Further, the final sheet of Comparative Example 53 exhibited a nonrecrystallized structure. There were no recrystallized grains present so measurement of their average grain size was not possible.

Comparative Example 54 in Table 4 showing the result of evaluation of the properties of the test sample was within the scope of composition of the present invention. Also, the final annealing was salt bath annealing simulating continuous annealing at a holding temperature of 425° C. and holding time of 10 seconds. The tensile strength of the final sheet and the value of elongation of the final sheet satisfied the reference values, but the value of (TS95−TS80) and the value of elongation after cold rolling the final sheet by a rolling reduction of 90% failed to satisfy the reference values. Specifically, Comparative Example 54 had a tensile strength of the final sheet of 95 MPa or more and a value of elongation of the final sheet of 40.0% or more, but the value of (TS95−TS80) was −3 MPa or more, and the value of elongation after cold rolling the final sheet by a rolling reduction of 90% was less than 5.0%. Therefore, Comparative Example 54 was evaluated as good in strength (Good), was evaluated as good in formability (Good), was evaluated as poor in work softenability (Poor), and was evaluated as poor in operating stability (Poor). Further, the final sheet of Comparative Example 54 exhibited a recrystallized structure and had an average grain size of the recrystallized grains of 13.6 μm.

Comparative Example 55 in Table 4 showing the result of evaluation of the properties of the test sample was within the scope of composition of the present invention. Also, the final annealing was salt bath annealing simulating continuous annealing at a holding temperature of 520° C. and holding time of 5 seconds. The tensile strength of the final sheet and the value of elongation of the final sheet satisfied the reference values, but the value of (TS95–TS80) and the value of elongation after cold rolling the final sheet by a rolling reduction of 90% failed to satisfy the reference values. Specifically, Comparative Example 55 had a tensile strength of 95 MPa or more and a value of elongation of the final sheet of 40.0% or more, but had a value of (TS95–TS80) of –3 MPa or more and had a value of elongation after cold rolling the final sheet by a rolling reduction of 90% of less than 5.0%. Therefore, Comparative Example 55 was evaluated as good in strength (Good), was evaluated as good in formability (Good), was evaluated as poor in work softenability (Poor), and was evaluated as poor in operating stability (Poor). Further, the final sheet of Comparative Example 55 exhibited a recrystallized structure and had an average grain size of recrystallized grains of 12.0 μm.

From the above, it is learned that aluminum alloy sheet for battery lid use having the above specific component composition and having a tensile strength of 95 MPa or more, a value of elongation of 40% or more, and a recrystallized structure, having a value of (TS95–TS80) of less than –3 MPa when defining a tensile strength after cold rolling by a rolling reduction of 80% as TS80 and defining a tensile strength after cold rolling by a rolling reduction of 95% as TS95, and exhibiting values of elongation after cold rolling by a rolling reduction of 90% of 5.0% or more has suitable strength, is excellent in formability and work softenability, and can form an integrated explosion-proof valve with little variation in operating pressure.

The invention claimed is:

1. Aluminum alloy sheet for battery lid use for forming an integrated explosion-proof valve having a component composition containing Fe: 1.05 to 1.50 mass %, Mn: 0.15 to 0.70 mass %, Ti: 0.002 to 0.15 mass %, and B: less than 0.04 mass %, having a balance of Al and impurities, having an Fe/Mn ratio restricted to 1.8 to 7.0, restricting, as impurities, Si to less than 0.40 mass %, Cu to less than 0.03 mass %, Mg to less than 0.05 mass %, and V to less than 0.03 mass %, having a tensile strength of 95 MPa or more, having a value of elongation of 40% or more, having a recrystallized structure, having a value of (TS95-TS80) of less than –3 MPa when defining a tensile strength after cold rolling by a rolling reduction of 80% as TS80 and defining a tensile strength after cold rolling by a rolling reduction of 95% as TS95, and having a value of elongation after cold rolling by a rolling reduction of 90% of 5.0% or more.

2. The aluminum alloy sheet for battery lid use for forming an integrated explosion-proof valve according to claim 1, wherein an average grain size of the recrystallized grains of the recrystallized structure is 15 to 30 μm.

3. A method of production of the aluminum alloy sheet for battery lid use for forming an integrated explosion-proof valve according to claim 1, comprising:
a slab casting process of casting an aluminum alloy melt having a component composition according to claim 1 into a cast ingot by a semicontinuous casting method,
a homogenization treatment process of homogenizing the cast ingot at a 520 to 620° C. holding temperature for a 1 hour or more holding time,
a hot rolling process of setting a start temperature to 420 to less than 520° C. after said homogenization treatment process so as to hot roll the cast ingot to obtain hot rolled sheet,
a cold rolling process of cold rolling said hot rolled sheet to obtain a cold rolled sheet, and
a final annealing process of annealing said cold rolled sheet in a batch furnace for final annealing, wherein:
in said cold rolling process, the final cold rolling is performed with a final cold rolling reduction of 50% to 95% in range and,
in said final annealing process, the final annealing is performed with a holding temperature of 300 to 450° C. for 1 hour or more.

4. A method of production of the aluminum alloy sheet for battery lid use for forming an integrated explosion-proof valve according to claim 2, comprising:
a slab casting process of casting an aluminum alloy melt having a component composition according to claim 1 into a cast ingot by a semicontinuous casting method,
a homogenization treatment process of homogenizing the cast ingot at a 520 to 620° C. holding temperature for a 1 hour or more holding time,
a hot rolling process of setting a start temperature to 420 to less than 520° C. after said homogenization treatment process so as to hot roll the cast ingot to obtain hot rolled sheet,
a cold rolling process of cold rolling said hot rolled sheet to obtain a cold rolled sheet, and
a final annealing process of annealing said cold rolled sheet in a batch furnace for final annealing, wherein:
in said cold rolling process, the final cold rolling is performed with a final cold rolling reduction of 50% to 95% in range and,
in said final annealing process, the final annealing is performed with a holding temperature of 300 to 450° C. for 1 hour or more.

* * * * *